July 31, 1962 J. L. ANDERSON 3,047,230

SUPERCONDUCTOR ADDER CIRCUIT

Filed Oct. 7, 1958 3 Sheets-Sheet 1

INVENTOR.
JOHN L. ANDERSON

BY John E. Dougherty Jr.

ATTORNEY

July 31, 1962 J. L. ANDERSON 3,047,230

SUPERCONDUCTOR ADDER CIRCUIT

Filed Oct. 7, 1958 3 Sheets-Sheet 2

July 31, 1962 J. L. ANDERSON 3,047,230

SUPERCONDUCTOR ADDER CIRCUIT

Filed Oct. 7, 1958 3 Sheets-Sheet 3

United States Patent Office 3,047,230
Patented July 31, 1962

3,047,230
SUPERCONDUCTOR ADDER CIRCUIT

John L. Anderson, Poughkeepsie, N.Y., assignor to International Business Machines Corporation, New York, N.Y., a corporation of New York Filed Oct. 7, 1958, Ser. No. 765,760
6 Claims. (Cl. 235—175)

The present invention relates to superconductor circuits and more particularly to thin film type superconductor circuits and methods of fabricating such circuits.

Probably the best known of the superconductor switching devices is the wire wound cryotron which, as described in U.S. Patent No. 2,832,897, issued on April 29, 1958, consists of a gate wire of superconductor material around which is wound a control coil which is selectively energized and de-energized to control the gate wire between resistive and superconductive states. A variety of computer type circuits are shown and described in the above cited patent, each of which basically comprises at least two parallel superconductor paths. Each such path includes a cryotron gate wire and the inputs to the circuit are selectively applied to control coils for these gate wires so that, for each parallel combination, one gate wire is resistive and the other superconductive. With the gate wires in this condition the entire current from a source connected to the parallel paths including the gate wires is directed through the path which includes the superconductive gate wire.

Further logical circuits including cryotron type devices have been developed which, as illustrated in copending application, Serial No. 736,313, filed May 19, 1958, and assigned to the assignee of the subject application, are fabricated with two logical circuits in parallel, one of which is driven resistive when the inputs to the control conductors wound around gate conductors connected in the logical circuits satisfy a particular logical function and the other of which is driven resistive only when the inputs satisfy a logical function which is the inverse of this particular logical function. As is pointed out in the above cited application and explained in detail in copending application, Serial No. 625,512, filed November 30, 1956, and assigned to the assignee of the subject application, cryotron devices may be fabricated of thin planar films of superconductor material which may, for example, be less than 10,000 Angstroms in thickness. These film type devices may be constructed to exhibit a relatively low inductance and high gate resistance and, therefore, may be employed in circuits having relatively high operating frequencies.

In accordance with the principles of the present invention, superconductor logical circuits are provided, and specifically a binary full adder herein described as an illustrative embodiment, which do not require two parallel logical circuits which are driven resistive in accordance with inverse logical functions. Further, in accordance with the principles of the invention, novel logical circuits are provided which utilize multi-apertured plates of superconductor material, which may be in the form of perforated foils or evaporated films. These plates form the various logically related series and parallel connected conductor paths for the logical circuits. Circuits of this type as well as novel and improved methods of fabricating such circuits are herein disclosed by way of illustrating the principles of the invention in accordance with which thin film superconductor circuits may be fabricated with a first plurality of superconductor strips, which may be considered to serve as gate conductors, and a second plurality of superconductor strips, which may be considered control conductors, with each control conductor traversing a number of the gate conductors but effective when energized to drive resistive only a certain one or more of the gate conductors which it traverses. This is accomplished by fabricating the strips forming the gate conductors with individual sections of hard and soft superconductor material and arranging the control strip to traverse the soft superconductor sections of one or more of the gate strips and the hard superconductor sections of the remaining ones of the gate strip. In accordance with another embodiment of the invention, a similar circuit is achieved by fabricating the control strips so that they are relatively narrow at the point at which they traverse one or more of the gate strips and wider at the point at which they traverse others of the gate strips. In the structure of this embodiment, the strips forming the gate conductor may, if desired, be fabricated entirely of soft superconductor material.

Therefore, it is an object of the present invention to provide novel and improved superconductors circuits and more particularly thin film superconductor circuits as well as novel methods of fabricating such circuits.

Another object is to provide superconductor circuits which employ multi-apertured plates of superconductor material as well as novel methods of fabricating such circuits.

A further object is to provide a method for fabricating superconductor circuits as well as novel circuits fabricated in accordance with this method, which circuits include a first plurality of superconductor strips including sections of hard and soft superconductor material and a second plurality of hard superconductor strips each of which traverses the soft superconductor section of one or more of the strips in the first plurality and the hard superconductor sections of the other strips in the first plurality.

Another object is to provide novel superconductor circuits including a plurality of gate strips traversed by a plurality of individual control strips wherein at least one of the dimensions of each of the control strips is different at the point it traverses one of the gate strips than at the point it traverses another of the gate strips.

A more specific object of the subject invention is to provide a novel method of fabricating circuits in accordance to the above method employing vacuum evaporating techniques.

A further object is to provide a method of fabricating such a circuit requiring a minimum number of evaporating steps.

Still another object is to provide circuits of the above discussed type wherein the strips forming the gate conductors need not be magnetically shielded from the strips forming the control conductors at any of the points at which said strips cross each other.

Still another object of the present invention is to provide novel superconductor logical circuits and, more specifically, improved binary full adder circuits which do not require the utilization of superimposed control conductors, nor the provision of two separate parallel circuits connected to be responsive to the inputs applied in accordance with inverse logical functions.

Other objects of the invention will be pointed out in the following description and claims and illustrated in the accompanying drawings, which disclose, by way of example, the principle of the invention and the best mode, which has been contemplated, of applyling that principle.

Figure 2:
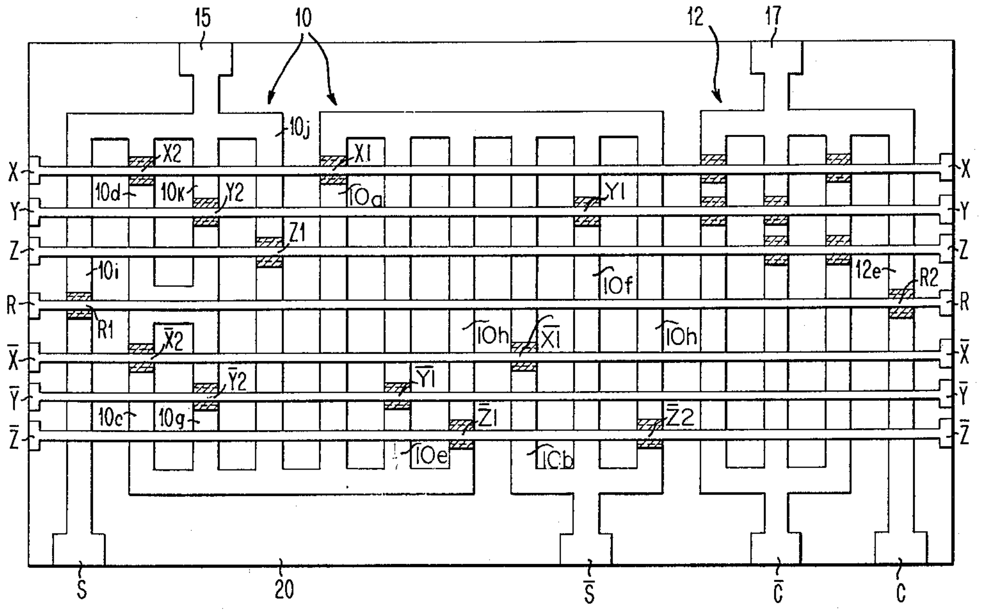
FIG. 2 is a schematic representation of a planar film binary full adder circuit which may be fabricated utilizing vacuum evaporation techniques.
Figure 2A:
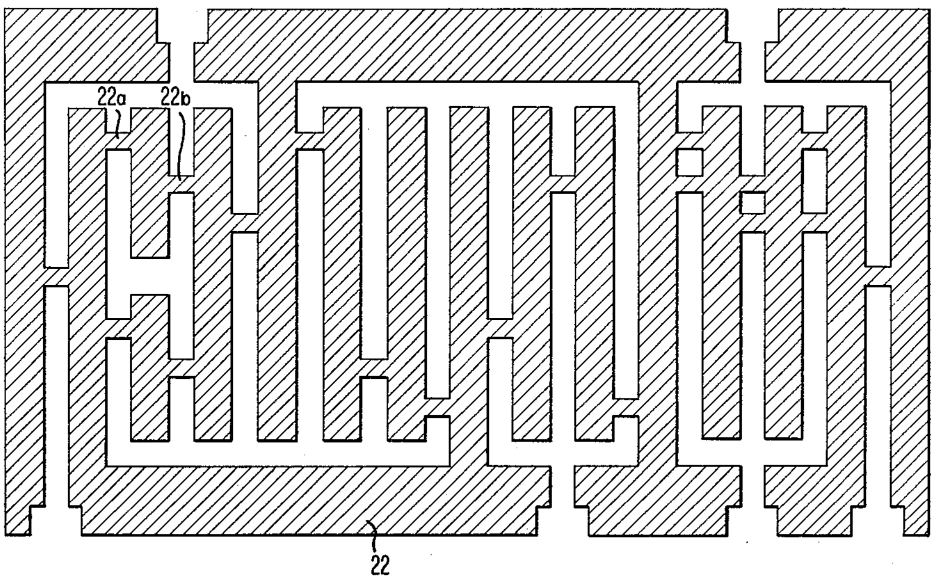
Figure 2B:
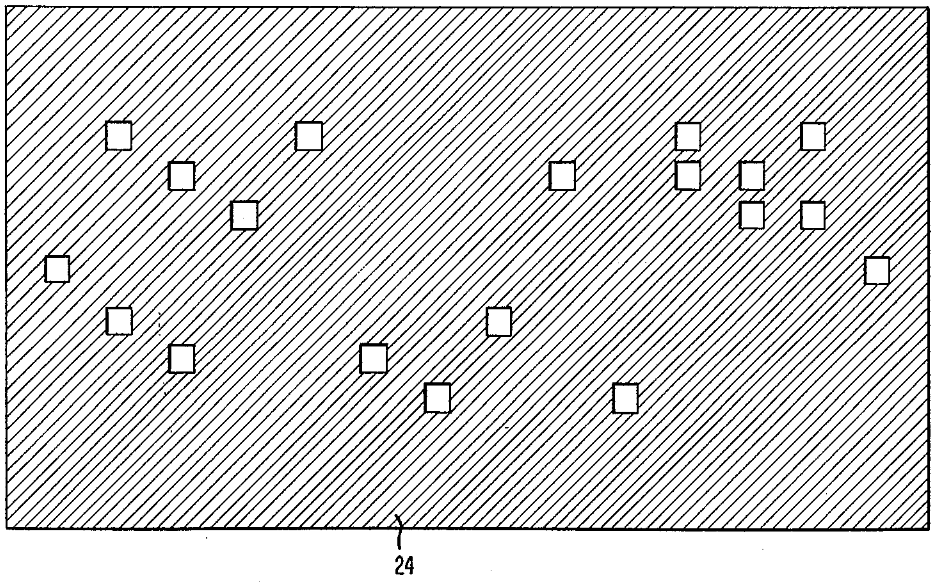
Figure 2C:
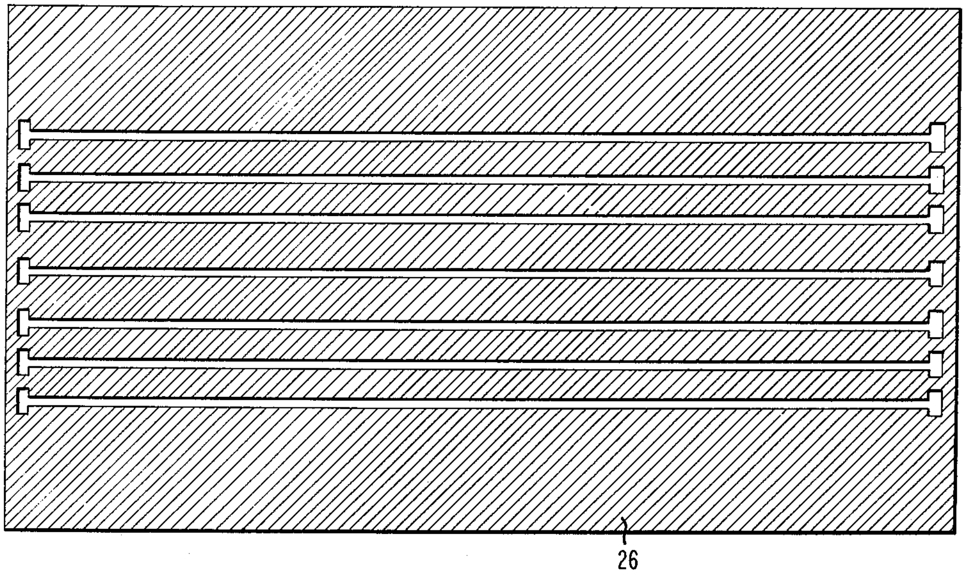

FIGS. 2A, 2B, and 2C show masks which may be utilized in vacuum evaporating the circuit of FIG. 2.

Figure 3:
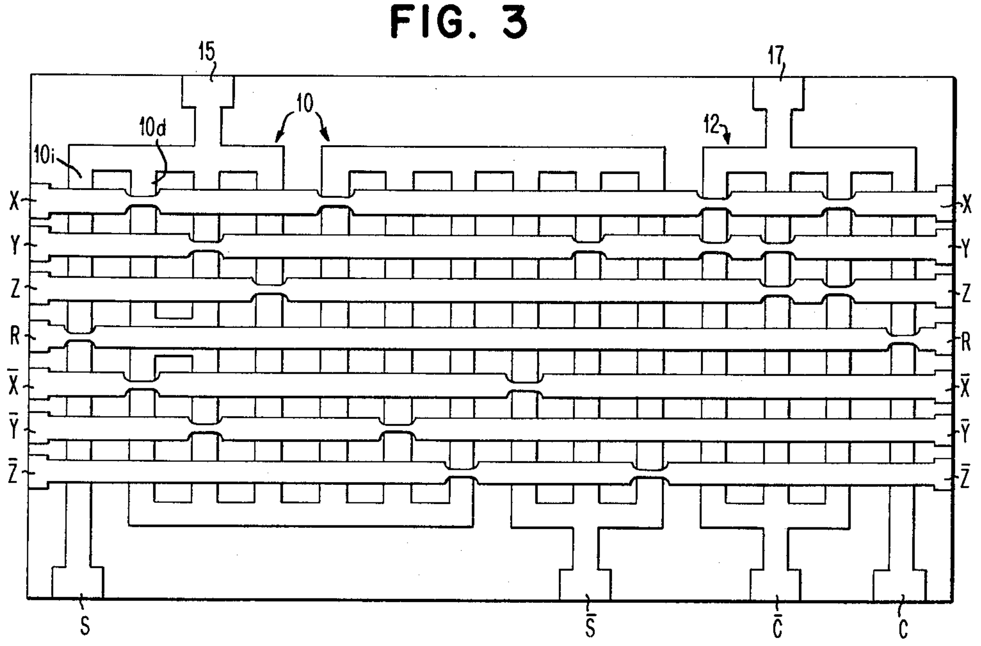

FIG. 3 shows a further embodiment of a binary full adder circuit which may be constructed in accordance with the principles of the invention utilizing vacuum evaporation techniques.

Figure 1:
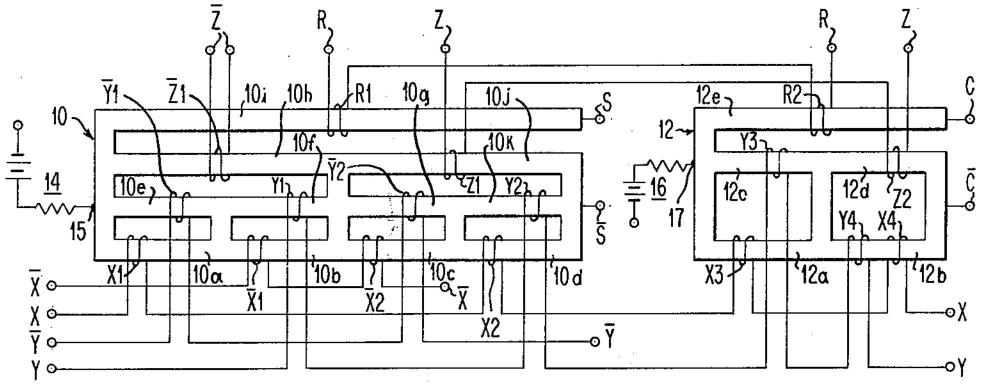
FIG. 1 is a schematic representation of a binary full adder circuit employing a multi-apertured plate of superconductor material.

Referring now to FIG. 1, the full binary adder circuit there shown includes two plates which may be in the form of foil or deposited films of superconductor material. One of these plates, which is generally designated 10, is termed the sum plate and is utilized in performing the logic necessary to generate the sum output for the adder. The other plate, which is generally designated 12, is termed the carry plate and is used in generating the carry output for the adder. The electrical operation of this circuit will be first explained and thereafter various methods of fabricating the circuit in accordance with the principles of this invention.

There are three binary inputs to the adder circuit and a reset input and these inputs are applied in the form of current pulses to a selected one or more of a plurality of control conductors, or coils, which link the individual current paths formed by the apertures in the plates 10 and 12. Plates 10 and 12 are provided with input terminals 15 and 17, respectively, to which current for the plate is supplied by current sources 14 and 16, respectively. Each of the plates is provided with a pair of output terminals, which are designated S and $\bar{S}$ for plate 10, and C and $\bar{C}$ for plate 12. The plates are fabricated of a material which is superconductive at the operating temperature for the circuit and, in the absence of current in any of the control coils, the current from sources 14 and 16 divides between the parallel paths formed by the aperture in each plate inversely in the proportion to the inductances of these paths. The entire current supplied to either plate may be directed to either one of the two output terminals for that plate by driving certain of the paths from a superconductive to a resistive state in a manner which will be explained in detail as the description progresses.

The three variable inputs to the circuit are termed "X," "Y," "Z," one of which may be connected to the carry output from a lower order adder of the same type. An "X" input of one is applied by causing current to flow between a pair of terminals designated X, and an "X" input of zero is applied by causing current flow between a pair of terminals designated $\bar{X}$. In a similar manner "Y" and "Z" inputs of one and zero are applied by applying current between terminals Y and Z, and $\bar{Y}$ and $\bar{Z}$, respectively. The circuit is reset by producing current flow between a pair of reset terminals which are designated R. Each of the above input circuits includes at least one control coil embracing one of the paths on one of the plates 10 or 12 and, in order to facilitate the explanation of the circuit, each of these coils is identified with the letter used to identify the terminal to which it is connected, with a numeral appended. Further, the various paths or strips into which the plates 10 and 12 are divided by the apertures are identified utilizing the numeral designation for the plate with a letter appended. Thus, for example, there are four control coils in the circuit connected to the X terminals and these coils are designated X1, X2, X3, and X4, and respectively embrace strips 10*a* and 10*d* on plate 10, and paths 12*a* and 12*b* on plate 12. These coils and the strips which they embrace may be considered as cryotron control and gate conductors. When a current pulse is applied between any of the pairs of input terminals, each of the coils or control conductors series connected between those terminals produces a magnetic field sufficient to drive the strip or gate conductor which it embraces from a superconductive to a resistive state. The coils and their connecting leads are insulated from the plate and the fields generated by current in the leads is insufficient to drive portions of the plates resistive at those points at which these leads traverse the plate. Thus, for example, when a current pulse is applied between the terminals X, only portions of the strips 10*a*, 10*d*, 12*a* and 12*b* are driven resistive.

Prior to the application of binary inputs at the X, $\bar{X}$, Y, $\bar{Y}$, Z, $\bar{Z}$ terminals, the circuit is reset by applying a current pulse between the terminals R, thereby energizing coils R1 and R2 and causing strips 10*i* and 12*e* to be driven resistive. As a result, the entire current from source 14 is directed through those strips of plate 10 which are in parallel with strip 10*i* to the output terminal designated $\bar{S}$. Similarly, the entire current from source 16 is directed to the $\bar{C}$ output terminal for plate 12. The input pulse applied between the R terminals is maintained for a time sufficient to obtain this current distribution and is then terminated. Since both of the plates are then entirely superconductive, there is no change in the current distribution and the entire current from source 14 for plate 10 continues to be directed to output terminal $\bar{S}$ and the entire current from source 16 for plate 12 to output terminal $\bar{C}$. With the circuit in this condition, the "X," "Y," and "Z" inputs may be applied. The coils connected to these terminals embrace strips other than strip 10*i* on plate 10 and other than strip 12*e* on plate 12. A logical equation showing the combinations of inputs for which a sum output should be produced in accordance with the rules of binary addition is expressed below:

$$S=X\bar{Y}\bar{Z}+\bar{X}Y\bar{Z}+\bar{X}\bar{Y}Z+XYZ$$

Examining plate 10, it can be seen that the lower portion of that plate actually consists of four series connected circuits connected in parallel with strip 10*i* across source 14. The first such parallel circuit consists of strips 10*a*, 10*e*, and 10*h*; the second circuit consists of strips 10*b*, 10*f*, and 10*h*; the third circuit consists of strips 10*c*, 10*g*, and 10*j*; the fourth circuit consists of strips 10*d*, 10*k*, and 10*j*. The windings connected to the binary input terminals are so arranged that whenever the inputs are such that a sum output of one is required, each of the paths in one of these series connected parallel circuits is driven resistive and, therefore, the current from source 14 is directed into strip 10*i* and to the output terminal S indicating a sum output of one. Thus, for example, for a binary input of $X\bar{Y}\bar{Z}$, which corresponds to the first input combination requiring a sum output of one in accordance with the logical expression above, strips 10*a*, 10*e*, and 10*h* are driven resistive, thereby causing the supply current to be directed to the output terminal S. When the inputs are such that a sum output of zero is to be produced, one or more of the strips in each of these groups remains superconductive so that, though a small portion of the current from source 14 may be shifted to strip 10*i*, the majority of this current continues to be directed to the output terminal $\bar{S}$ indicating a sum output of zero. The portion of the current shifted to strip 10*i* under these conditions varies in accordance with the inputs and may be minimized by making strip 10*i* longer and/or narrower than the other strips thereby increasing its inductance.

The design of the carry plate 12 and the manner in which the windings are arranged on the strips of this plate are similar. The combinations of inputs requiring a carry output of one in accordance with the rules of binary addition are shown in the following logical expression:

$$C=XYZ+XY\bar{Z}+X\bar{Y}Z+\bar{X}YZ$$

It can be seen by examination of the windings on plate 12 that strips 12*a* and 12*c* are driven resistive whenever the inputs applied correspond to either of the first two combinations of the above logical expression and strips 12*b* and 12*d* are driven resistive when either of the latter two combinations in the expression are satisfied. Therefore, the entire current from source 16 is directed to output terminal C, indicative of a carry output of one, only when the inputs applied satisfy the requirements of the above expression. For all other combinations of inputs, the majority of current from source 16 continues to be directed to terminal $\overline{C}$, indicative of a carry output of zero.

It should be noted that once the binary inputs are applied and the source current directed to the proper terminals S, $\overline{S}$, C, $\overline{C}$ in accordance with these inputs, this condition is stable until after a reset pulse is applied between the terminals R. Therefore, the circuit of FIG. 1 actually stores the result of the binary addition. It should be further noted that, as a result of the mode of operation employed, a superconductive full binary adder is realized without employing superimposed control conductors and also without providing sum and carry circuits which include one logical circuit which is superconductive for a combination of inputs for which an output of one is required and another complete logical circuit in parallel with the first which is superconductive only when the inputs applied are such that an output of zero is required.

The circuit of FIG. 1 may be fabricated merely by taking a foil of a superconductive material 10 and using an appropriate cutting instrument to perforate the foil to obtain the desired configuration of paths. Thereafter, it is only necessary to apply the control windings for the various binary and reset inputs in the manner shown and the circuit is completely fabricated. The foil employed may be self supporting or may be mounted on an appropriate substrate, such as glass, in which case the substrate would have to be provided with openings to allow for the passage of control conductors around the various strips.

It is also possible to provide multi-apertured logical circuits of the type illustrated in the FIG. 1 using evaporation techniques throughout. In such circuits, both the strips through which the supply current is directed to one or the other of two output terminals and the strips to which the binary inputs are applied may be fabricated of planar thin films of superconductor material. One example of such a circuit is shown in FIG. 2 and, in this figure, since a full binary adder is also illustrated, designations corresponding to those utilized in FIG. 1 are employed to identify corresponding functional components. The circuit of FIG. 2 comprises a base or substrate of insulating material 20 on which there are first evaporated the various strips forming the conductor paths between a current input terminal 15 and one and zero sum output terminals S and $\overline{S}$. At the same time, the paths for the plate 12 connecting a current input terminal 17 to one and zero carry output terminals C and $\overline{C}$ may be evaporated. In evaporating the plates 10 and 12, as will be explained in more detail later, all of the strips for these plates are fabricated of a hard superconductor material, with the exception of those portions which are to be driven resistive by current applied to the control inputs and these portions are fabricated of a soft superconductor material. The terms hard and soft are relative, the former indicating a superconductor which requires a magnetic field of relatively large intensity to cause it to be driven resistive at the operating temperature of the circuit, and the latter term indicating a material which, at the operating temperature, requires a magnetic field of relatively small intensity to drive it into a resistive state.

On top of the strips which form plates 10 and 12, the narrower binary input and reset conductor strips are deposited, after a layer of a suitable insulating material such as silicon monoxide has been evaporated so that the plates and reset and binary input conductors are properly insulated. The portions of the plates 10 and 12 which are fabricated of a soft superconductor material are indicated by cross hatching and the binary inputs and reset strips are fabricated so that they traverse soft superconductor sections of one or more selected strips of the plates 10 and 12. Thus, for example, the conductor strip between reset terminals R is arranged to traverse soft superconductor material in sections of strips 10*i* of plate 10 and 12*e* of plate 12. Though this conductor also traverses a section of each of the other strips, these sections are fabricated of hard superconductor material so that, when a reset pulse is applied between the terminals R, only the soft superconductor sections of strips 10*i* and 12*e* traversed by the reset strip are driven resistive. It is, therefore, apparent that this crossing of the narrow control conductor over the soft superconductor portion of the wider conductor path of plates 10 and 12 actually forms a device which operates functionally to achieve the same function as the windings R1 and R2 wound around sections of strips 10*i* and 12*e* in FIG. 1 and, for this reason, designations R1 and R2 and similar designations corresponding to those used to identify the coils in FIG. 1 are here employed to designate the points at which the reset and binary input strips extending between terminals R, X, $\overline{X}$, etc. traverse soft superconductor sections of plates 10 and 12 which are driven resistive when current pulses are applied to the reset and binary input conductors.

The logical arrangement of the circuit of FIG. 2 differs only slightly from that of FIG. 1, the basic principles being the same in that the circuit is first reset so that the entire supply current flows in a portion of plate 10 and similarly in a portion of plate 12 which is driven resistive only when later applied binary inputs are such as to require a sum output of one and/or a carry output of one to be produced. In the sum circuit of FIG. 2 which includes legs 10*a* through 10*k*, leg 10*h* has two portions in which cryotrons $\overline{Z}1$ and $\overline{Z}2$ are connected. The logical operation of the sum circuit is, however, the same as that of FIG. 1 satisfying the following expression:

$$S=XYZ+\overline{XY}Z+X\overline{YZ}+\overline{X}Y\overline{Z}$$

Each of the four parallel circuits series connected between terminal 15 and $\overline{S}$ is driven resistive by one of these input combinations. Legs 10*d*, 10*k* and 10*j* are resistive for inputs XYZ; legs 10*c*, 10*g* and 10*j* are resistive for inputs $\overline{XY}Z$; legs 10*a*, 10*e* and 10*h* are resistive for inputs $X\overline{YZ}$; and legs 10*b*, 10*f* and 10*h* are resistive for inputs $\overline{X}Y\overline{Z}$. The only other major difference in the layout of the circuits is that, in FIG. 2, the portion of plate 12 in parallel with the strip 12*e* includes three strips forming a single parallel circuit, rather than two series connected parallel circuits each including two strips as in FIG. 1. However, it is apparent from the drawings that all three of these paths will be driven resistive when the binary inputs are such that a carry output of one is to be produced. The reason for this arrangement is to obviate the necessity of crossing the binary input and reset conductors one over the other, which would necessitate an extra evaporation step in the fabrication of the circuit of FIG. 2, as will become apparent as the description progresses.

The three masks which may be utilized for fabricating the circuit of FIG. 2 are shown in FIGS. 2A, 2B, and 2C, respectively. The mask 22 of FIG. 2A is employed to evaporate the hard superconductor portions of the plates 10 and 12. Note should here be made of the fact that, though the completed plates 10 and 12 include a number of apertures and, therefore, could not be completely evaporated at one time with a single continuous mask, the mask 22 of FIG. 2A is continuous with the portions of the mask such as 22A and 22B providing connecting links between those portions of the mask which define the apertures which are to appear in the completed plate structure. The first evaporation through the mask 22 is accomplished using a hard superconductor material which, for example, may be lead and the lead may be evaporated on a glass substrate. After completion of the first evaporation, the mask 24 of FIG. 2B is employed to evaporate a soft superconductor material, such as tin, to bridge the openings in the conductor paths of plates 10 and 12 and, at the same time enclose all of the apertures in these plates. After evaporation of the tin sections of plates 10 and 12, a layer of insulating material such as silicon monoxide is evaporated over the entire substrate including the plates 10 and 12. The final step in the fabrication process is to evaporate the reset and binary input conductors utilizing the mask 26 of FIG. 2C. These conductors are preferably fabricated of hard superconductor material, such as lead, so that they remain in a superconductive state under all conditions of circuit operation. It should be noted that by utilizing the method described in accordance with which shielding layers are not required between any of the sections of the strips forming plates 10 and 12 and the reset and binary input strips at points at which the latter strips traverse the former, only four evaporation steps are required.

The circuit may also be fabricated using further evaporation steps to evaporate shield planes of hard superconductor material such as are described in copending application, Serial No. 625,512, filed November 30, 1956, to reduce the inductance of the various conductors forming the circuit and, therefore, improve the time constant of the circuit as well as shielding the circuit from stray magnetic fields. When such a construction is desired, a shield plane of hard superconductor material would be first evaporated on the substrate and, thereafter, a layer of insulating material such as silicon monoxide prior to the evaporation of the lead portions of the plates 10 and 12 with the mask of FIG. 2A. The shield plane may also be fabricated of the hard superconductor material lead. A further shield plane may also be provided on top of the reset and binary input conductors which are evaporated with shield 26, in which case a layer of silicon monoxide would be evaporated to insulate these conductors from this shield plane.

Referring now to FIG. 3, there is shown another embodiment of a full adder circuit which is similar in many respects to that shown in FIG. 2. The basic difference between the adders of FIGS. 2 and 3 is in the manner of arranging the binary input and reset conductor strips with respect to the conductor strips forming plates 10 and 12 so that, though each of the reset and binary input strips traverses a number of the strips of these plates, only certain of the plate strips are driven resistive when a particular one of the binary input and reset conductors is energized. In the circuit of FIG. 3, the entire plates 10 and 12 may be fabricated of a soft superconductor material such as tin. Each of the reset and binary input strips is fabricated so that it is wider at the points at which it traverses plate strips which are not to be driven resistive when a current pulse is applied to that reset or binary input strip than at the points at which it traverses plate strips which are to be driven resistive when an input pulse is applied to that reset or binary input strip. The intensity of the magnetic field, produced when a current input pulse is applied to any one of these input conductor strips, varies in accordance with the dimensions of the conductor at right angles to the direction in which the current flows therein. Thus, for example, when a current pulse is applied to the conductor strip between the terminals X, this current, in passing through the portion of this strip which traverses strip 10*i* of plate 10, does not produce a field of sufficient intensity to drive strip 10*i* resistive. However, the intensity of the field produced by this current adjacent the narrower portion of this conductor at the point at which it traverses strip 10*d* is sufficient to drive strip 10*d* resistive. In this manner, by evaporating the control strips over the strips forming plates 10 and 12 with the control strips narrow only at those points at which it is desired that they be able to control a strip of the plates 10 and 12 between resistive and superconductive states, the circuit may be fabricated with the plates 10 and 12 made entirely of a soft superconductor material such as tin. Of course the same design of the binary input and reset conductors as is shown in FIG. 3 may be utilized in a circuit of the type shown in FIG. 2 wherein the plate conductors include portions of both hard and soft superconductor material.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A superconductor binary full adder comprising a sum circuit and a carry circuit, said sum circuit comprising a first group of planar superconductor gates forming a plurality of series connected parallel circuits and a first planar shunt gate only in parallel with said series connected parallel circuits across a current source, said carry circuit comprising a second group of planar superconductor gates forming a further parallel circuit and a second planar shunt gate only in parallel with said further parallel circuit across a current source, means maintaining said gates at a temperature at which each is superconductive in the absence of a magnetic field, a reset control conductor only arranged in magnetic field applying relationship to said first and second shunt gates and effective when a current signal is applied thereto to drive these gates resistive, a plurality of input control conductors each arranged in magnetic field applying relationship to one or more corresponding ones of said gates of said sum and carry circuits and each effective when a current pulse is applied thereto to drive only said one or more corresponding gates resistive, means for applying a reset signal to said reset control conductor to drive said first and second shunt gates resistive and thereby cause the current in each of said sum and carry circuits to be directed through the circuit connected in parallel with the shunt gate across the current source therefor, and means for applying current signals representative of first, second and third binary values to be added to said input control conductors after said reset signal is terminated whereby the circuit in parallel with said first shunt gate is driven resistive directly in response to said signals on said input control conductors only when the inputs applied require a sum output in accordance with the rules of binary addition and the circuit connected in parallel with said second shunt gate is driven resistive directly in response to said signals on said input control conductors only when the inputs applied require a carry output in accordance with the rules of binary addition.

2. The circuit of claim 1 wherein each of said sum and carry circuits comprise a multi-apertured plate of superconductive material.

3. The circuit of claim 1 wherein each of said gates of said sum and carry circuits comprise a first plurality of planar strips of superconductor material and said reset and input control conductors comprise a second plurality of strips of superconductor material each traversing said strips in said first plurality.

4. The circuit of claim 3 wherein each of said strips in said first plurality include individual sections of hard and soft superconductor material and each of said strips in said second plurality traverses the soft superconductor section of at least one of said strips in said first plurality and the hard superconductor section of at least one other of said strips in said first plurality.

5. The circuit of claim 3 wherein each of said strips in said second plurality is narrower at the point it traverses one of said strips in said first plurality than at the point it traverses another of said strips in said first plurality and each of said strips in said first plurality is fabricated entirely of superconductive material.

6. A planar superconductor full adder circuit comprising; a first group of superconductor strips extending in a first direction; a second group of superconductor strips extending in a second direction and traversing said strips in said first group; said strips in each group traversing only strips in the other group; said strips in said first group including a plurality of gates traversed by strips in said second group and controllable thereby between superconducting and resistive states; said strips in said first group forming a sum circuit and a carry circuit; said sum circuit including first, second, third and fourth parallel circuits connected in series circuit relationship and a first shunt path in parallel with said series connected parallel circuits; said carry circuit including a fifth parallel circuit and a second shunt path connected in parallel with said fifth parallel circuit; means for applying a signal to a first one of said strips in said second group to introduce resistance into each of said first and second shunt paths and for thereafter applying inputs representative of first, second and third binary values to be added to the others of said strips in said second group; each of said first, second, third and fourth parallel circuits in said sum circuit being driven resistive for a different combination of binary inputs requiring a sum output of one and said fifth parallel circuit in said carry circuit being driven resistive in response to said binary inputs for each combination of inputs requiring a carry output of one.

References Cited in the file of this patent

UNITED STATES PATENTS

| | | |
|---|---|---|
| 2,756,485 | Abramson | July 31, 1956 |
| 2,870,963 | Threadgold | Jan. 27, 1959 |
| 2,877,540 | Austen | Mar. 17, 1959 |
| 2,888,201 | Housman | May 26, 1959 |
| 2,949,602 | Crowe | Aug. 16, 1960 |

OTHER REFERENCES

Buck: The Cryotron, IRE Proceedings, April 1956, pages 482–493.

Garwin: An Analysis of the Operation of a Persistent-Supercurrent Memory Cell, IBM Journal, October 1957, pages 304–308.

"Electrical Manufacturing," February 1958, pp. 78–83.

"IBM Journal," October 1957, pp. 295–302.